US006633960B1

(12) United States Patent
Kessler et al.

(10) Patent No.: US 6,633,960 B1
(45) Date of Patent: Oct. 14, 2003

(54) SCALABLE DIRECTORY BASED CACHE COHERENCE PROTOCOL

(75) Inventors: Richard E. Kessler, Shrewsbury, MA (US); Kourosh Gharachorloo, Menlo Park, CA (US); David H. Asher, Sutton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 09/652,703

(22) Filed: Aug. 31, 2000

(51) Int. Cl.$^7$ .......................... G06F 12/00; G06F 12/14
(52) U.S. Cl. ...................... 711/144; 711/145; 711/148
(58) Field of Search ...................... 711/118, 141–146, 711/148, 156

(56) References Cited

U.S. PATENT DOCUMENTS

| | | | |
|---|---|---|---|
| 5,261,066 A | 11/1993 | Jouppi et al. | 395/425 |
| 5,317,718 A | 5/1994 | Jouppi | 395/425 |
| 5,680,576 A | * 10/1997 | Laudon | 711/124 |

(List continued on next page.)

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A Logic Design Structure For LSI Testability*, E. B. Eichelberger et al., 1977 IEEE (pp. 462–468).
*Direct RDRAM ™ 256/288–Mbit (512K×16/18×32s)*, Preliminary Information Document DL0060 Version 1.01 (69 p.).
*Testability Features of AMD–K6 ™ Microprocessor*, R. S. Fetherston et al., Advanced Micro Devices (8 p.).
*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).
*Are Your PLDs Metastable?*, Cypress Semiconductor Corporation, Mar. 6, 1997 (19 p.).
*Rambus® RIMM ™ Module (with 128/144Mb RDRAMs)*, Preliminary Information, Document DL0084 Version 1.1 (12 p.).

(List continued on next page.)

*Primary Examiner*—Matthew Kim
*Assistant Examiner*—Woo H. Choi

(57) ABSTRACT

A system and method is disclosed to maintain the coherence of shared data in cache and memory contained in the nodes of a multiprocessing computer system. The distributed multiprocessing computer system contains a number of processors each connected to main memory. A processor in the distributed multiprocessing computer system is identified as a Home processor for a memory block if it includes the original memory block and a coherence directory for the memory block in its main memory. An Owner processor is another processor in the multiprocessing computer system that includes a copy of the Home processor memory block in a cache connected to its main memory. Whenever an Owner processor is present for a memory block, it is the only processor in the distributed multiprocessing computer system to contain a copy of the Home processor memory block. Eviction of a memory block copy held by an Owner processor in its cache requires a write of the memory block copy to its Home and update of the corresponding coherence directory. No reads of the Home processor directory or modification of other processor cache and main memory is required. The coherence controller in each processor is able to send and receive messages out of order to maintain the coherence of the shared data in cache and main memory. If an out of order message causes an incorrect next program state, the coherence controller is able to restore the prior correct saved program state and resume execution.

32 Claims, 7 Drawing Sheets

U.S. PATENT DOCUMENTS

| | | | | |
|---|---|---|---|---|
| 5,758,183 | A | | 5/1998 | Scales .......................... 395/825 |
| 5,761,729 | A | | 6/1998 | Scales .......................... 711/148 |
| 5,787,480 | A | | 7/1998 | Scales et al. ................ 711/148 |
| 5,802,585 | A | | 9/1998 | Scales et al. ................ 711/154 |
| 5,809,450 | A | | 9/1998 | Chrysos et al. ............. 702/186 |
| 5,848,434 | A | * | 12/1998 | Young et al. ................ 711/144 |
| 5,875,151 | A | | 2/1999 | Mick .......................... 365/233 |
| 5,890,201 | A | | 3/1999 | McLellan et al. ............ 711/108 |
| 5,893,931 | A | | 4/1999 | Peng et al. .................. 711/206 |
| 5,918,250 | A | | 6/1999 | Hammond ................... 711/205 |
| 5,918,251 | A | | 6/1999 | Yamada et al. ............. 711/207 |
| 5,923,872 | A | | 7/1999 | Chrysos et al. ............. 395/591 |
| 5,950,228 | A | | 9/1999 | Scales et al. ................ 711/148 |
| 5,958,019 | A | * | 9/1999 | Hagersten et al. ........... 709/400 |
| 5,964,867 | A | | 10/1999 | Anderson et al. ........... 712/219 |
| 5,983,325 | A | | 11/1999 | Lewchuk ..................... 711/137 |
| 6,000,044 | A | | 12/1999 | Chrysos et al. ................ 714/47 |
| 6,070,227 | A | | 5/2000 | Rokicki ....................... 711/117 |
| 6,085,300 | A | | 7/2000 | Sunaga et al. ............... 711/168 |
| 6,122,714 | A | * | 9/2000 | VanDoren et al. ........... 711/121 |
| 2002/0078304 | A1 | * | 6/2002 | Masri et al. ................. 711/134 |

OTHER PUBLICATIONS

*Direct Rambus ™ RIMM ™ Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

* cited by examiner

SCALABLE DIRECTORY BASED CACHE COHERENCE PROTOCOL

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency" Ser. No. 09/652,322, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency and Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, and "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable

BACKGROUND OF THE INVENTION

1. Field of the Invention

The present invention generally relates to a computer system with multiple processors. More preferably, the present invention generally relates to the sharing of data among processors in a Distributed Shared Memory ("DSM") computer system. Still, more particularly, the invention relates to a scalable high performance directory based cache coherence protocol that allows data sharing among processors in a DSM computer system.

2. Background of the Invention

Distributed computer systems typically comprise multiple computers connected to each other by a communications network. In some distributed computer systems, the network computers can access shared data. Such systems are sometimes known as parallel computers. If a larger number of computers are networked, the distributed system is considered to be "massively" parallel. One advantage of a massively parallel computer is that it can solve complex computational problems in a reasonable amount of time.

In such systems, the memories of the computers are collectively known as a Distributed Shared Memory ("DSM"). It is a problem to ensure that the data stored in a DSM is accessed in a coherent manner. Coherency, in part, means that only one processor can modify any part of the data at any one time, otherwise the state of the system would be nondeterministic.

Recently, DSM systems have been built as a cluster of Symmetric Multiprocessors ("SMP"). In SMP systems, shared memory can be implemented efficiently in hardware since the processors are symmetric (e.g., identical in construction and in operation) and operate on a single, shared processor bus. Symmetric Multiprocessor systems have good price/performance ratios with four or eight processors. However, because of the specially designed bus that makes message passing between the processors a bottleneck, it is difficult to scale the size of an SMP system beyond twelve or sixteen processors.

It is desired to construct large-scale DSM systems using processors connected by a network. The goal is to allow processors to efficiently share the memories so that data fetched by one program executed on a first processor from memory attached to a second processor is immediately available to all processors.

Caches connected to each processor of the computer system permit faster access to data from the main memory of each computer system. Caches are useful because they reduce memory latencies on cache hits. However, unique to DSM multiprocessing computer systems, the copies of memory locations stored in each computer system cache allow for inconsistent copies to develop if a coherency protocol that enforces cache consistency is not implemented in the computer system. This coherency protocol must typically be designed in such a manner that it scales to very large processor configurations with maximum memory system performance. Prior art systems suffered from performance bottlenecks due to the bus based cache coherence protocols prevalent in such systems. Bus based coherence protocols limit the number of processors that can be incorporated into such a high performance system. Directory based solutions to the problem of cache and memory coherence scale much better to larger systems because they can be efficiently adapted to more arbitrary and larger numbers of processor interconnects.

BRIEF SUMMARY OF THE INVENTION

The problems noted above are solved in large part by a distributed multiprocessing computer system that contains a plurality of processors, each connected to RAMbus™ Inline Memory Modules ("RIMM") main memory. Thus, each processor preferably has an associated main memory constructed of RIMMs. Each RIMM contains data that is shared between the processors. The main memory is subdivided into logical memory blocks indexed by a physical address used by the processor to access the memory block. Each memory block has an associated directory that maintains the coherence of the data in the memory block across all processors that may contain a copy of the memory block in the distributed multiprocessing computer system. Each memory block in main memory and its associated coherence directory has a designated Home processor. The Home processor contains the original memory block-other processors needing access to the memory block only contain copies of the Home processor memory block. An Owner processor is another processor in the multiprocessing computer system that includes a copy of the Home processor memory block in a cache connected to the Owner processor main memory. Whenever an Owner processor is associated with a memory block, it is the only processor in the distributed multiprocessing computer system permitted to contain a copy of the Home processor memory block. The Owner processor has permission to modify the contents of the memory block.

Each of the processors in the distributed multiprocessing computer system incorporates a coherence controller connected to a RIMM. A coherence controller maintains the coherence of the shared data in the memory module using the coherence directory in the Home processor. If the cache becomes full, a memory block may need to be replaced to make room for a new memory block. Thus, for the case of an Owner that contains a memory block copy, if this memory block copy is replaced from the Owner's cache memory, then the copy of the Owner memory block is written to the Home processor containing the original memory block. In addition, the corresponding directory entry in the Home processor for the memory block is updated. A read of the Home processor directory or modification of other processor cache and main memory RIMMs in the computer system is not required.

In each processor, the coherence controller sends and receives messages out of order to maintain the coherence of the shared data in the main memory RIMMs. If an out of order message causes an incorrect next program state, the cache and directory coherence controllers restores the prior correct saved program state and resume execution. In the distributed multiprocessing computer system, a processor needing to read or write to a memory block not present in its main memory or cache must then request a copy of the memory block from the Home processor. This processor is referred to as a Requester processor. After the Requester processor by consulting the Home processor has determined the owner of a cache block, Requester and Owner processors communicate directly to maintain cache coherency without routing through the Home processor directory.

A memory block in the distributed multiprocessing computer system also may be shared by multiple processors that have read only access capabilities to the memory block. These Sharer processors each contain a shared copy of the memory block in a cache connected to the Sharer processor main memory. A coherence controller in the processor maintains the coherence of the shared data in the main memory using the coherence directory for the memory block in the Home processor. Each coherence controller is capable of sending and receiving messages out of order to maintain the coherence of the shared data in the main memory. If out of order messages cause an incorrect next program state, the coherence controller is capable of restoring the prior correct saved program state and resume execution.

In the distributed multiprocessing computer system, a Requestor processor that encounters a read or write miss of a memory block in its main memory or cache can send and receive messages directly to Sharer processors to maintain cache coherency, without routing the messages through the Home processor directory. Eviction of the shared copy of the memory block in the Sharer processor cache caused by replacement of the memory block from the cache does not have to be communicated to the Home processor directory for the memory block.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
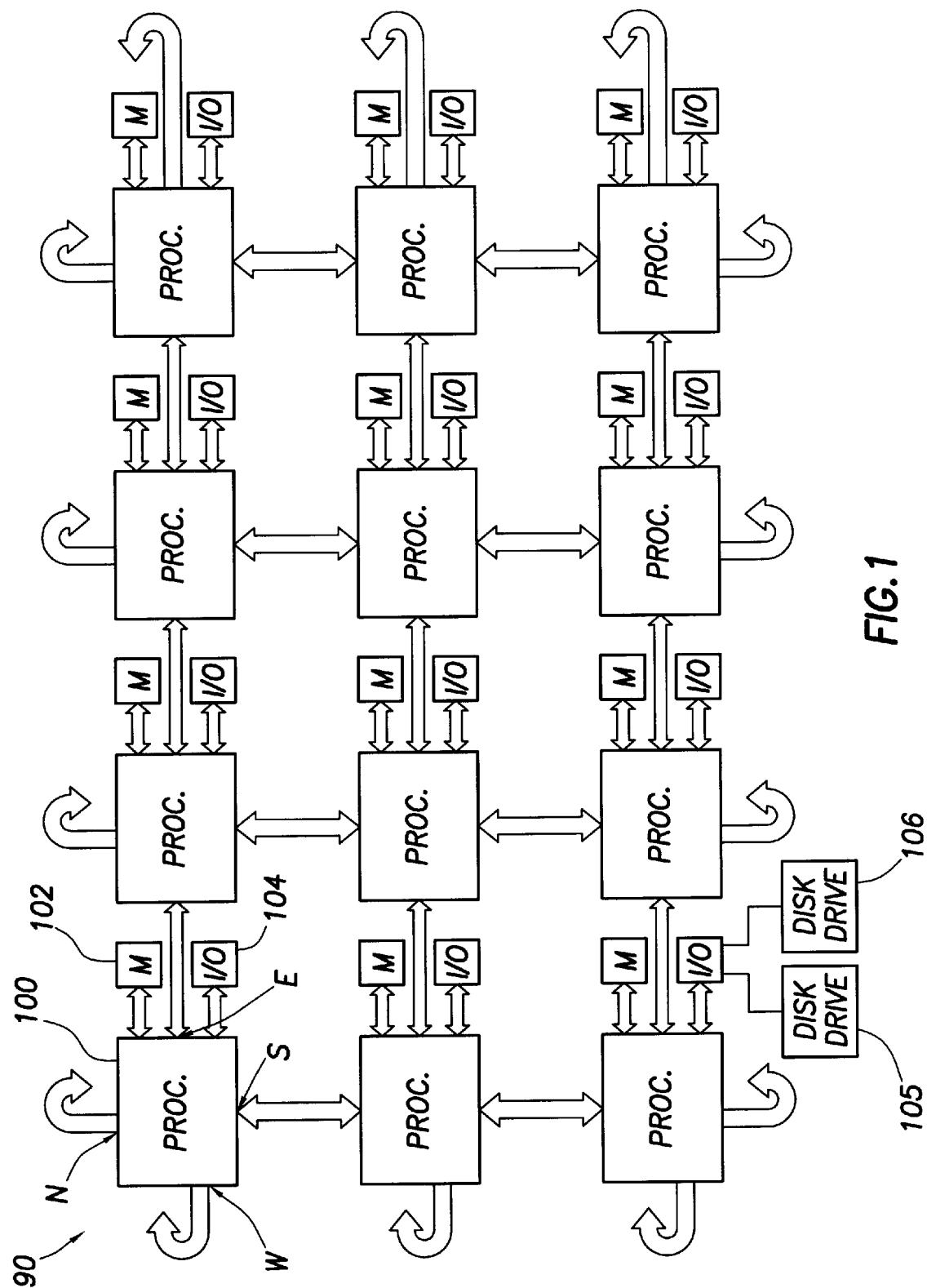
FIG. 1 shows a system diagram of a plurality of processors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture also known as a crossbar interconnection network architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM").

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Figure 2A:
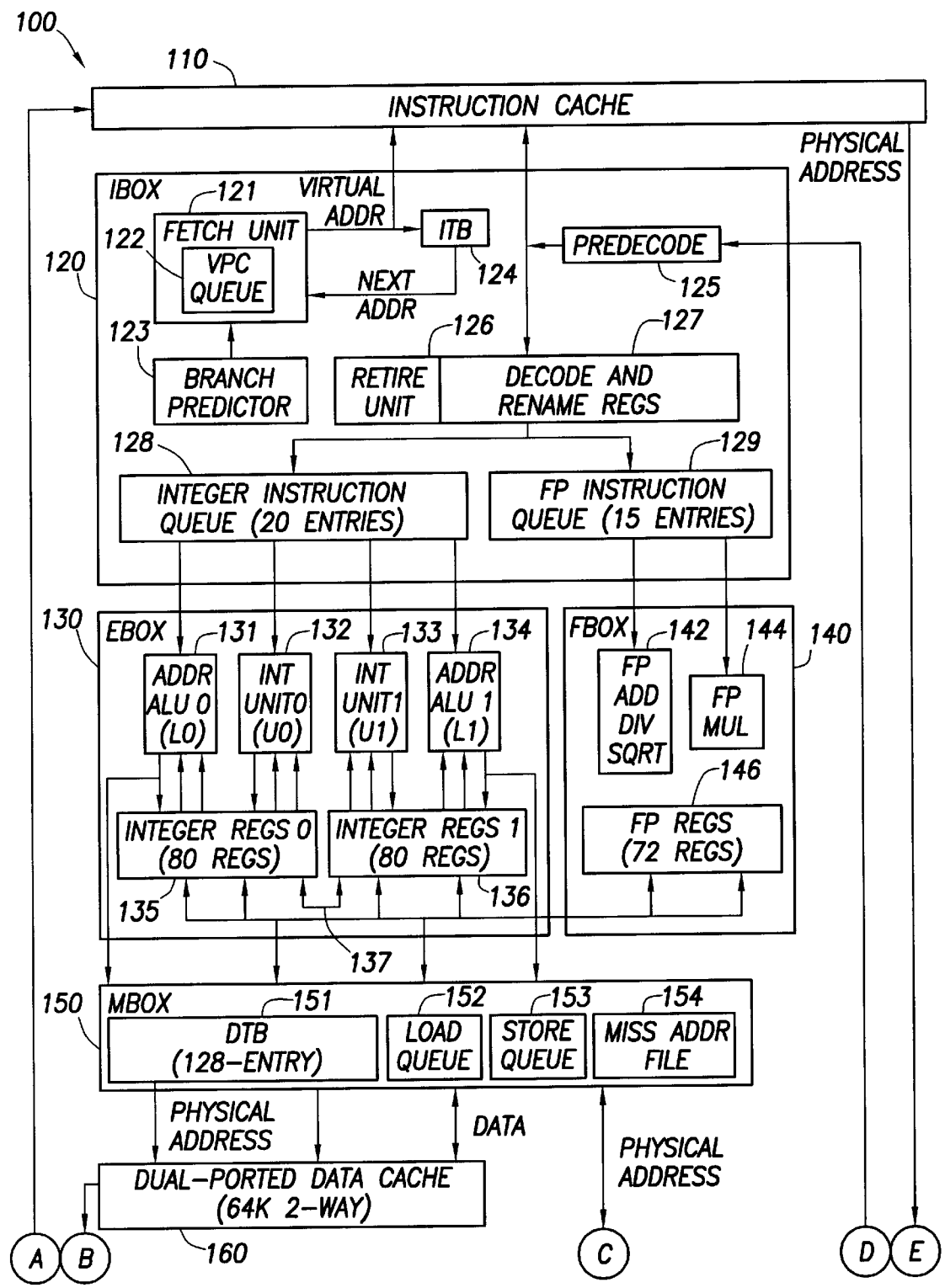
FIGS. 2a and 2b show a block diagram of the processors of FIG. 1.
Figure 2B:
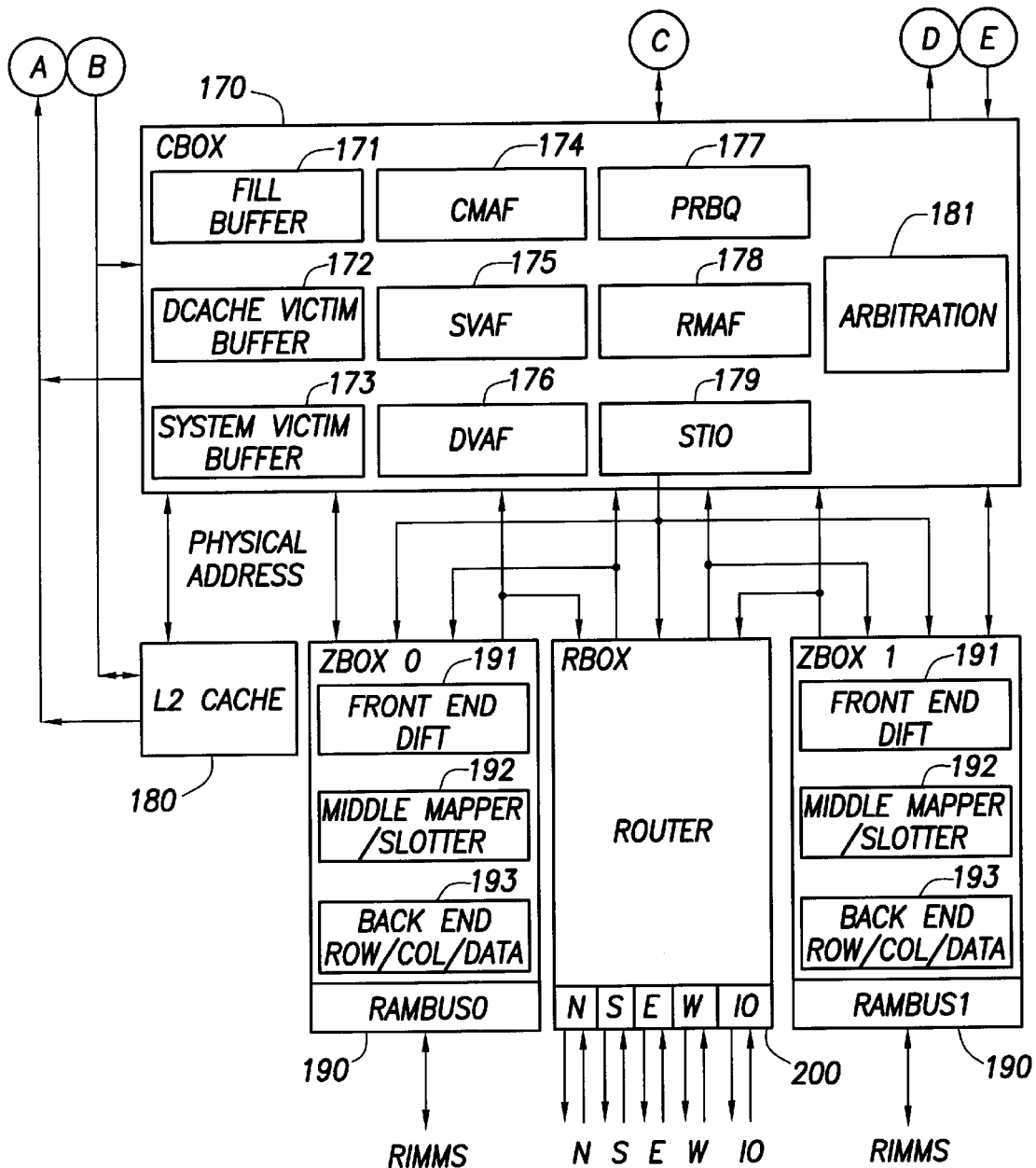

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicates with the control logic of various other functional units, control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

With regard to branch instructions, the Ibox 120 uses the branch predictor 123. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline. If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, twenty valid fetch slots containing up to eighty instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for twenty integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible twenty requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register-to-integer-register transfer instructions are queued in both the integer and floating-point queues. These instructions wait in the floating-point queue until their operand register values are available from the floating-point execution unit ("Fbox") registers. The processor executing these instructions subsequently requests service from the store arbiter. Upon being issued from the floating-point queue 129, the processor executing these instructions signal the corresponding entry in the integer queue 128 to request service. Finally, the operation is complete after the instruction is issued from the integer queue 128.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for seventy-two entries including thirty-one floating-point registers and forty-one values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It preferably contains thirty-two entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It preferably contains thirty-two entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor. The miss address file ("MAF") 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2b). The L1 instruction cache 110 preferably comprises a 64-KB virtual-addressed, two-way set-associative cache. Prediction of future instruction execution is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64-KB, two-way set associative, virtually indexed, physically tagged, write-back, read/write allocate cache with 64-byte cache blocks. During each cycle the data cache 160 preferably performs one of the following transactions: two quad-word (or shorter) read transactions to arbitrary addresses, two quadword write transactions to the same aligned octaword, two non-overlapping less-than quadword writes to the same aligned quadword, one sequential read and write transaction from and to the same aligned octaword. Preferably each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 preferably is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

As will be understood by one skilled in the art, the L2 cache 180 comprises a secondary cache for the processor 100, which typically is implemented on a separate chip. The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 in the Cbox preferably buffers data received from other functional units outside the Cbox 170. The data and instructions get written into the fill buffer 171 and other logic units in the Cbox 170 process the data and instructions before sending to another functional unit or the L1 cache 110 and 160. The data cache victim buffer ("VDF") 172 preferably stores data flushed from the L1 cache 110 and 160 or sent to the System Victim Data Buffer 173. The System Victim Data Buffer ("SVDB") 173 sends data flushed from the L2 cache to other processors in the system and to memory. Cbox Miss-Address File ("CMAF") 174 preferably holds addresses of L1 cache misses. CMAF 174 updates and maintains the status of these addresses. The System Victim-Address File ("SVAF") 175 in the Cbox 170 preferably contains the addresses of all SVDB data entries. Data Victim-Address File ("DVAF") 176 preferably contains the addresses of all data cache victim buffer ("VDF") 172 data entries.

The Probe Queue ("PRBQ") 177 preferably comprises a 18-entry queue that holds pending system port cache probe commands and addresses. The Probe Queue 177 includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox 170 preferably accepts requests and responds with data or instructions from the L2 cache. Data accesses from other functional units in the processor, other processors in the computer system or any other devices that might need data out of the L2 cache are sent to the RMAF 178 for service. The Store Input/Output ("STIO") 179 preferably transfer data from the local processor to I/O cards in the computer system. Finally, arbitration unit 181 in the Cbox 170 preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus memory controllers 190 (Zbox0 and Zbox1). Each Zbox 190 controls 4 or 5 channels of information flow with the main memory 102 (FIG. 1). Each Zbox 190 preferably includes a front-end directory in flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200, and tracking up to thirty-two in-flight transactions. The front-end DIFT 191 also sends directory read and write requests to the Zbox 190 and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
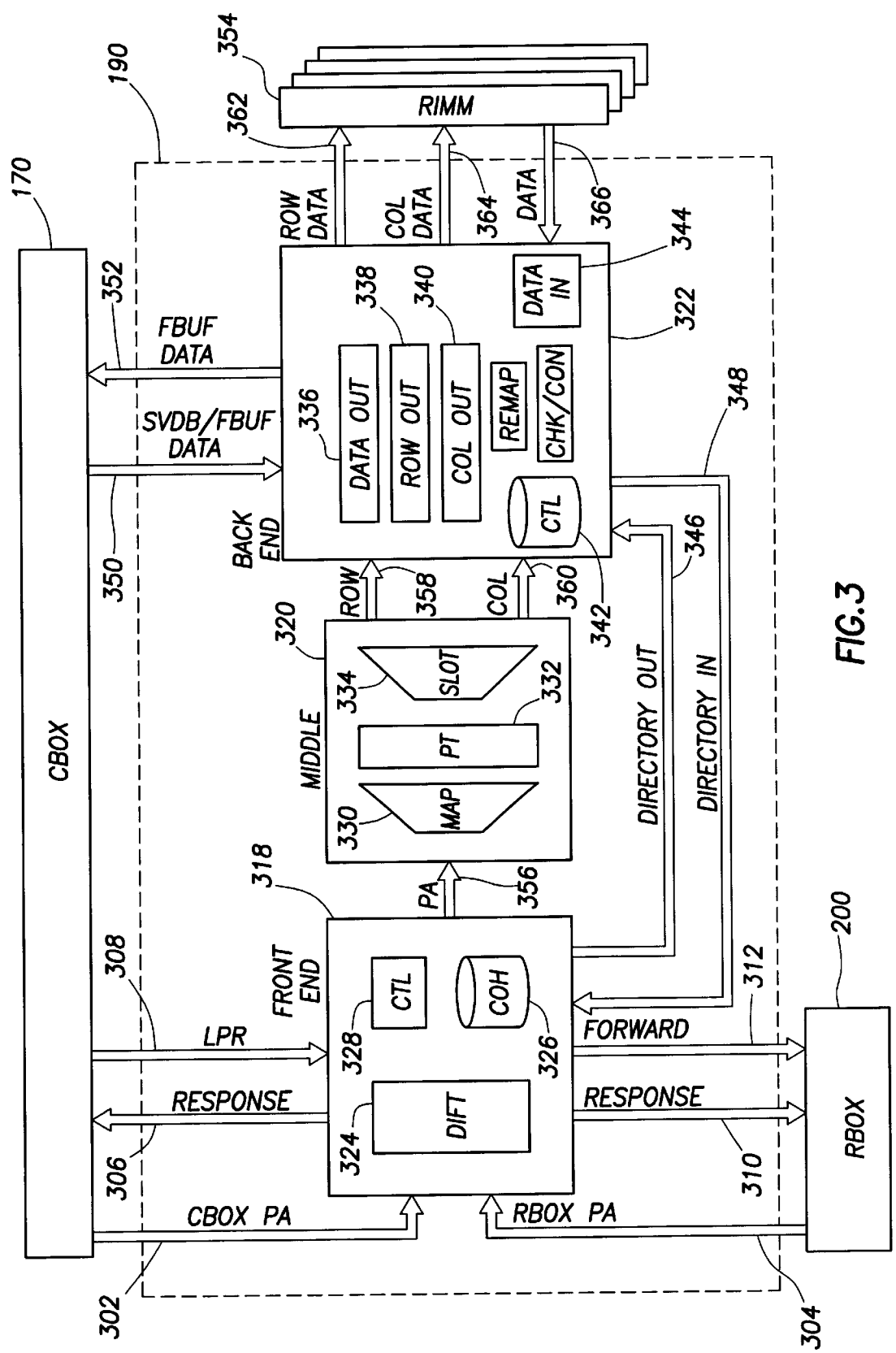
FIG. 3 shows the Zbox memory controller of FIG. 2b in more detail including the coherency hardware.

Referring now to FIG. 3, a more detailed description of the Zbox front end, middle and back end hardware. The front end 318 of the Zbox 190 may receive a physical address 302 from the Cbox 170 or a physical address 304 from the Rbox 200. The front end also generates and transmits Response messages 306 and 310 to the Cbox 170 and Rbox 200. Forward coherence messages 312 are generated by the front end 318 and transmitted to the Rbox 200. The Cbox 170 transmits Local Probe Responses ("LPR") 308 to the front end. The front end 318 contains a directory in flight table ("DIFT") 324, Controller ("CTL") 328 and the cache coherence controller 326 that manages the directory based memory coherence protocol for the cache and main memory.

The DIFT receives message packets from the Cbox 170 or the Rbox 200. It sends directory read and write requests generated by the coherency controller to the Zbox middle section 320. The DIFT instructs the back end 322 to write memory data and ECC (error correction codes) into a fill buffer 171 in the Cbox 170 to satisfy the request. The directory in flight table also receives local probe responses from the Cbox 170. The coherence controller 326 in conjunction with the directory in flight table conditionally updates the memory coherence directory based on the request type, LPR status, and directory state through the directory out bus 346 to the coherence table 342.

Zbox middle section 320 consists of a map 330 that maps the Physical Address ("PA") 356 received from the front end into preferably RAMbus™ device format by device, bank, row and column. The map 330 also maintains an open page table 332 that tracks all open pages up to one kilobyte in size. The map closes pages in the page table 332 on demand if there are bank conflict issues. A slot 334 schedules RAMbus™ transactions by updating request queues PRE, RES and CAS.

The Zbox back end 322 packetizes address, control and data into RAMbus™ format. The Zbox back end includes registers data out 336, row out 338 and column out 340. The data in buffer 344 takes inbound data from RAMbus™ Inline Memory Modules ("RIMM") and converts this to the appropriate format accessible to the processor. The back end receives from the Cbox 170 system victim and fill buffer data 350 and outputs fill buffer data 352 to the Cbox. Back end 322 receives row 358 and column 360 address from the middle section and converts these octaword formats to 8-byte RAMbus™ format.

Figure 4:
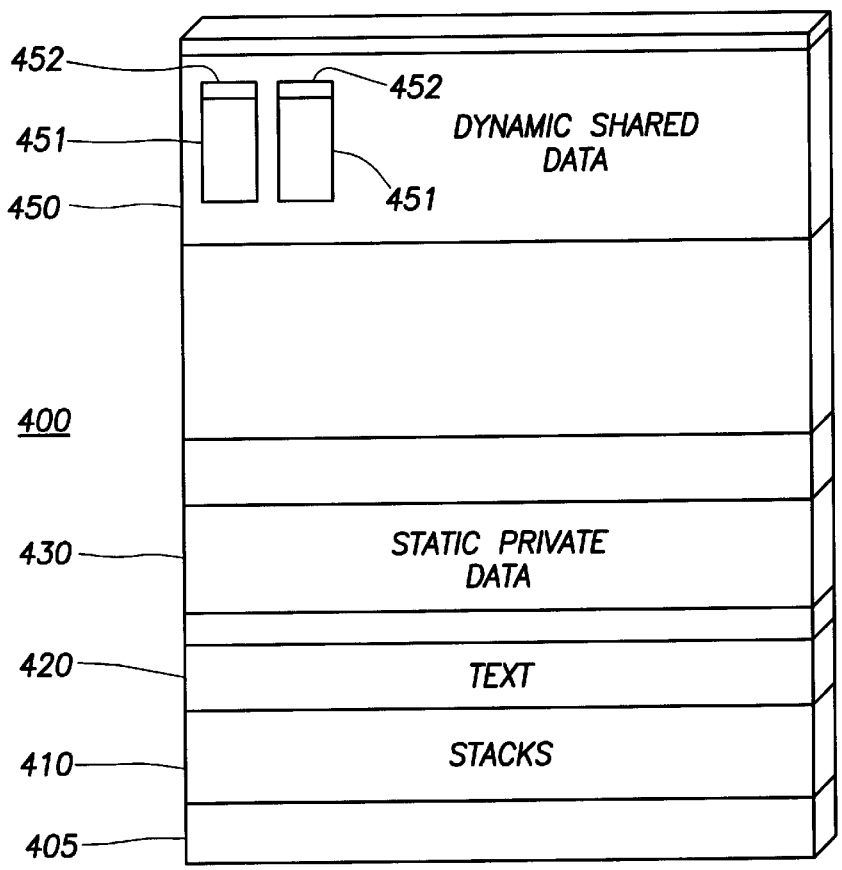
FIG. 4 shows a block diagram of main memory partitioned into shared, private, and system space.

Referring now to FIG. 4, an allocation of addresses to a block of memory in RAMbus™ DRAM 354 as used in the preferred embodiment of the DSM computer system is shown. Addresses are reserved for stacks 410, program text 420, static private data 430, and dynamic shared data 450. The addresses in the static private data 430 are used to store data that are exclusively used by a single local processor, e.g., the data are not shared. The addresses in this portion of the memory are allocated when a particular program is loaded for execution.

In the preferred embodiment shown in FIG. 4, the processor generates 72-byte blocks of storage 451 in the shared data area of processor memory as shared memory. Preferably, coherence is maintained by means of the directory scheme noted above. This directory scheme maintains state information with each block of memory. The state indicates the current state of the block as well as the processors in the distributed computer system holding copies of the block. For each 64-bytes in the RAMbus™ DRAM, there are actually 72-bytes of storage, leaving 8 additional bytes, 452. In the preferred embodiment, the processor allocates a 9-bit ECC code on each 16-bytes of data. In addition to being stored with the 16-bytes in the RAMbus™ storage, the 9-bit ECC code is also used by the system caches. The 36-bit (64/16=4, 4*9=36 bits) ECC code leaves an extra 28 bits (8*8=64 bits, 64−36=28 bits) of storage for the directory information with each 72-byte block. Of the available 28 bits, 27 are used so that the directory information can be written independently of the data using the byte write capability of the RAMbus™ (RAMbus™ is capable of writing 9 bit bytes). Of the 27 bits, 6 bits are required for ECC coverage of the directory information and 21 bits of storage are available for the directory information.

A local reference to a processor's shared data does not update the memory coherence directory since coherence for a local reference is maintained by forcing all remote requests to locally probe the caches, MAF and the VAF before a request can complete. Remote requests must update the directory since that is the means by which knowledge about the use of the block is maintained globally.

In the preferred embodiment, the supported cache states are listed in Table 1.

TABLE 1

CACHE STATES

| STATE | MEANING |
|---|---|
| Invalid | Invalid error state. |
| Exclusive-Clean | This processor has an exclusive copy, the value is the same as memory. |
| Exclusive-Dirty | This processor has an exclusive copy, the value may be different than memory. |
| Shared | This processor has a read-only copy, the value is the same as memory. |

The processor must have a block in the Dirty state in the cache to write to the block in RAMbus memory.

A directory state stored in the shared data section 450 of RAMbus™ memory is 27-bits encoded as listed in Table 2 below. The least significant bits of any field in the Table are on the right side.

TABLE 2

DIRECTORY STATE ENCODING

| STATE | ENCODING: | COMMENTS |
|---|---|---|
| Bit Num. | 2    11    0       0 | |
| Bit Num. | 5    0    21   3   0 | |
| Local | CCCCCCXXXXXXXXXXXXXXXXXX0000 | |
| Incoherent | CCCCCCXXXXXXXXXXXXXXXXXX1000 | |
| Exclusive | CCCCCCXXXXXXXXXXEEEEEEEEI100 | |
| Shared1 | CCCCCCXXXXXXXXXXSSSSSSSS1110 | Shared with list of one share - S |
| Shared2 | CCCCCCXTTTTTTTTSSSSSSSS0110 | Shared with list of two shares - T,S |
| Shared3 | CCCCCCUUUTTTTTTTUUSSSSSSU010 | Shared with list of three sharers - U,T,S |
| SharedM | CCCCCCMMMMMMMMMMMMMMMMMMMM1 | Shared with mask |

Each symbol's meaning is given below
X Don't care.
C Error Correction Code ("ECC") storage.
I Tells whether the exclusive owner is a DMA device (1 = DMA).
E Eight bits for the (encoded) exclusive owner when in exclusive state allowing for 256 processors and an additional 256 DMA/IO devices.
M 20 bits for the sharing mask when in shared state.
S 8/6 bits for the first sharer.
T 8/6 bits for the second sharer.
U 6 bits for the third sharer, S and T are 6 bits.

TABLE 3

DIRECTORY STATES

| STATE | MEANING |
|---|---|
| Local state | Implies that no remote processors have a copy of the block. The block may be held either shared or exclusive locally (or not held at all). |
| Incoherent state | An error state. Error status ("ERRResp") is returned in response to a request to an incoherent block. |
| Exclusive state | Implies that exactly one remote processor holds the current copy of the block. The block may be either in the exclusive-clean or dirty states in the cache at that processor. A request that finds a block in the exclusive state will be forwarded to the exclusive owner. |
| Shared1 | Implies that one remote processor may have shared access to a block (as well as the local processor). |
| Shared2 | Implies that two processors may have shared copies of the block (as well as the local processor). |
| Shared3 | Implies that three processors may have shared copies of the block (as well as the local processor). This state is used only when the system has 64 processors or less. It is enabled by ZBOX0_PID_CTL[PIDWIDTH]. |

TABLE 3-continued

DIRECTORY STATES

| STATE | MEANING |
|---|---|
| SharedM state | Implies that one or more remote processors may have shared copies of the block, and that the local processor may also have a shared copy of the block. Each M bit indicates whether the corresponding processor(s) may have a copy of the block. An M bit is never set for the local processor. IPR settings define the correspondence between the bits in the mask and the processors in the system. For a simple example, each bit in the mask may refer to a four-processor quad in a 80-processor system. |

In the preferred embodiment of the invention, coherence messages are split into three types: REQUEST, FORWARD and RESPONSE. Load data REQUESTs are transferred from the requesting processor to the directory. The directory is examined to determine further action. If the block is local (that is, invalid in remote processors), the directory is updated and a RESPONSE is returned. If the block is in the exclusive state, the request may be FORWARD'ed from the directory to the exclusive owner of the block. A FORWARD'ed request normally results in a RESPONSE sent to both the requestor and to the directory. If the block is in the shared state and the request is to modify the block, invalidations of the shared blocks are FORWARD'ed from the directory to each of the shared copies and a RESPONSE is also sent to the requester. Upon receipt of the FORWARD'ed invalidates, a processor responds with invalidate acknowledge RESPONSEs.

The physical address space is partitioned into a Directory Processor Identifier ("DPID") and offset address. The DPID is the processor holding the physical memory and the offset address that selects which address at that processor. The processor of the preferred embodiment has a 43-bit physical address and a 43-bit I/O space address.

Turning now to FIGS. 5a through FIGS. 5g, cache and memory coherence is maintained by means of directories. The terminology for this directory-based scheme, and examples of its application, are described in FIGS. 5a through FIG. 5g. Nodes may be one of four types defined as follows:

Requestor (Req)—a node encountering and read or write miss.

Home—a node that contains the memory and directory for the reference block.

Owner (Own)—a remote node that contains an exclusive copy of the block in its cache.

Share (S)—a remote node that contains a shared copy of the block in its cache.

Figure 5A:
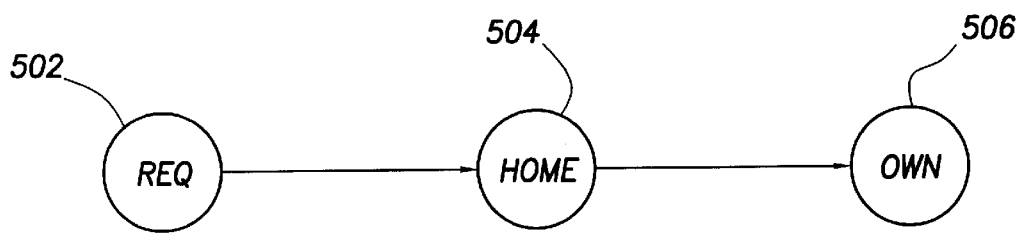
FIG. 5a shows the basic coherence topology with a Requester, Home, and Owner.

FIG. 5a shows the basic coherence topology with a Requestor 502, Home 504 and Owner 506. The Requestor makes a request for a read or write to the Home that contains the memory and directory for the requested block. If an Owner containing an exclusive copy of the block (as in FIG. 5a) is present, the Home node forwards the read or write request to the Owner.

Figure 5B:
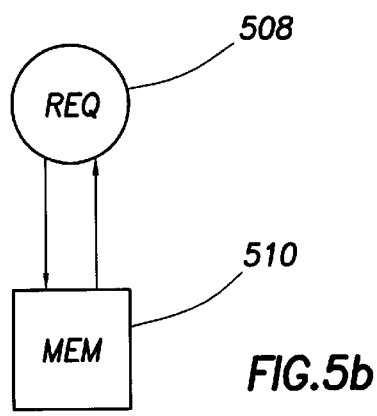
FIG. 5b shows an example of a Requester accessing a local Home for a read.

FIG. 5b is an example of a read Requestor 508 accessing a local Home (Requestor and Home are the same node). In this scenario the local Home/Memory 510 is at the Requestor node and the directory state is local or shared. The Requestor 508 retrieves the data directly from local memory 510 and does not update the directory because the state of the cache block at the Home 508 is determined by a check of the cache tag. Requests to a local Home are extremely efficient because an update of the directory is not required under these conditions.

Figure 5C:
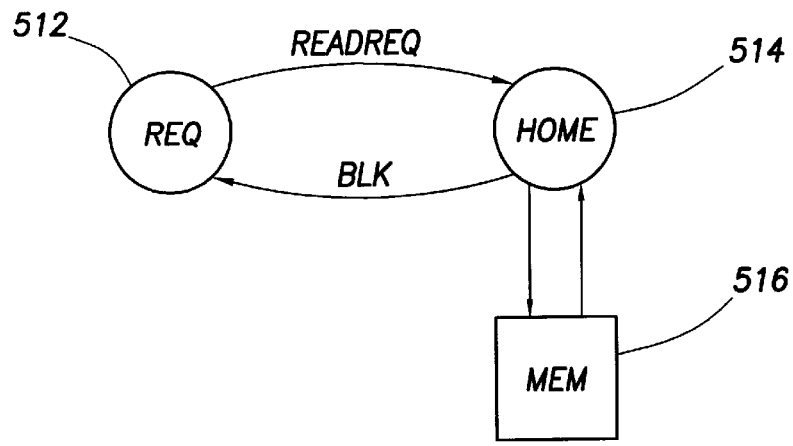
FIG. 5c shows an example of a remote read request to remote Home.

FIG. 5c shows an example of a read request to a remote Home 514. The Home 514 and Memory 516 is remote from the Requestor 512 and the directory state is shared or local. The Requestors request ("READREQ") is sent to Home 514 which then gets the block from cache/memory, updates the directory state and replies with the block ("BLK").

Figure 5D:
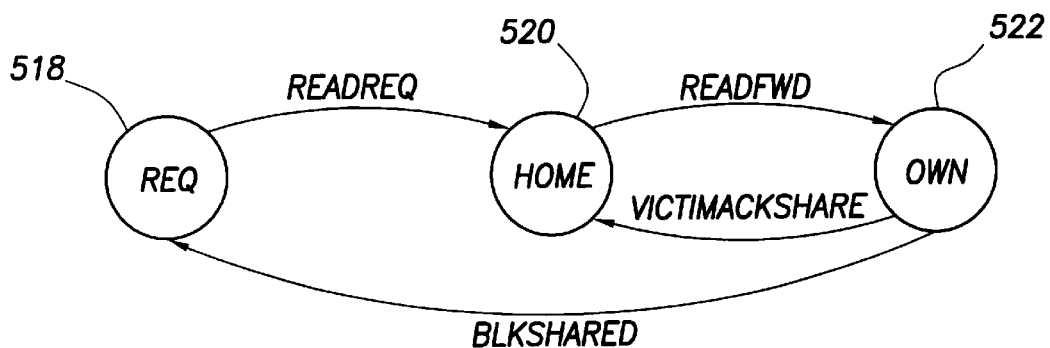
FIG. 5d shows an example of a remote read request with an Owner that is remote from the Home.

FIG. 5d shows a read request from a Requestor 518 for a memory block present in a remote Owner 522. In this scenario, the Home is remote, and the directory state is exclusive with the cache at the processor in the Owner 522 in a dirty state. The Requestor 518 requests a read ("READREQ") that is sent to the Home node 520 that contains the memory and directory for the referenced block. The Home 520 forwards the request to the Owner 522 ("READFWD") and leaves the directory pending in directory in flight table. The Owner 522 sends a read reply ("BLKSHARED") with the data to the Requestor 518, also writing back the data to Home 520. Owner sends a VICTIMACKSHARED message to Home indicating that the block is shared, with both the prior exclusive Owner and the Requestor in the directory/DIFT sharing list. The Home 520 makes the directory entry not pending in DIFT when VICTIMACKSHARED arrives. The pending state in the DIFT maintains serialization order.

Figure 5E:
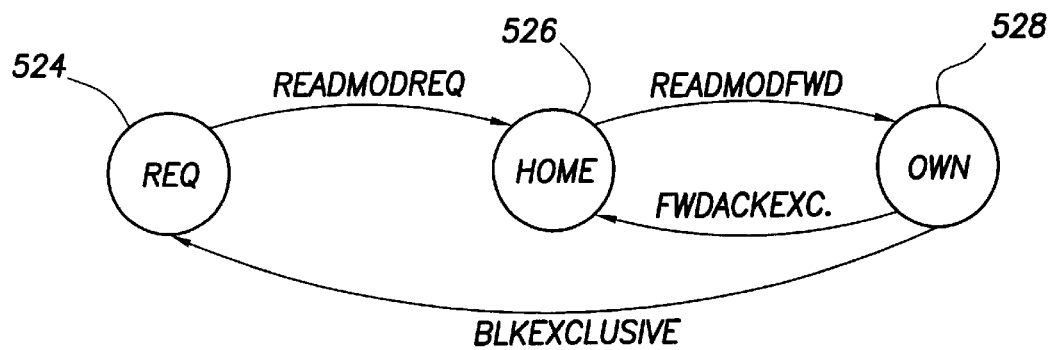
FIG. 5e shows an example of a remote write request with an Owner that is remote from the Home.

FIG. 5e shows a write request from a Requestor 524 to a memory block present in a remote Owner 528. In this scenario, the Home 526 is remote, and the directory state is exclusive with the cache at the processor in the Owner 528 in either a clean or dirty state. The Requestor 524 performs a modify request ("READMODREQ") that is sent to the Home node 526 containing the memory and directory for the referenced block. The Home 526 forwards the modify request to the Owner 528 ("READMODFWD") and leaves the directory state pending in the directory in flight table. The Owner 528 sends a reply ("BLKEXCLUSIVE") with the data to the Requestor 524 that modifies the data and stores it in cache in a dirty state. Owner 528 sends a FWDACKEXCL message to the Home 526 making the directory/DIFT state in the Home node indicate that the Requestor is the new exclusive owner. The Home 526 makes the directory entry not pending in DIFT when the FWDACKEXCL arrives. Use of the pending state in the DIFT maintains serialization order.

Figure 5F:
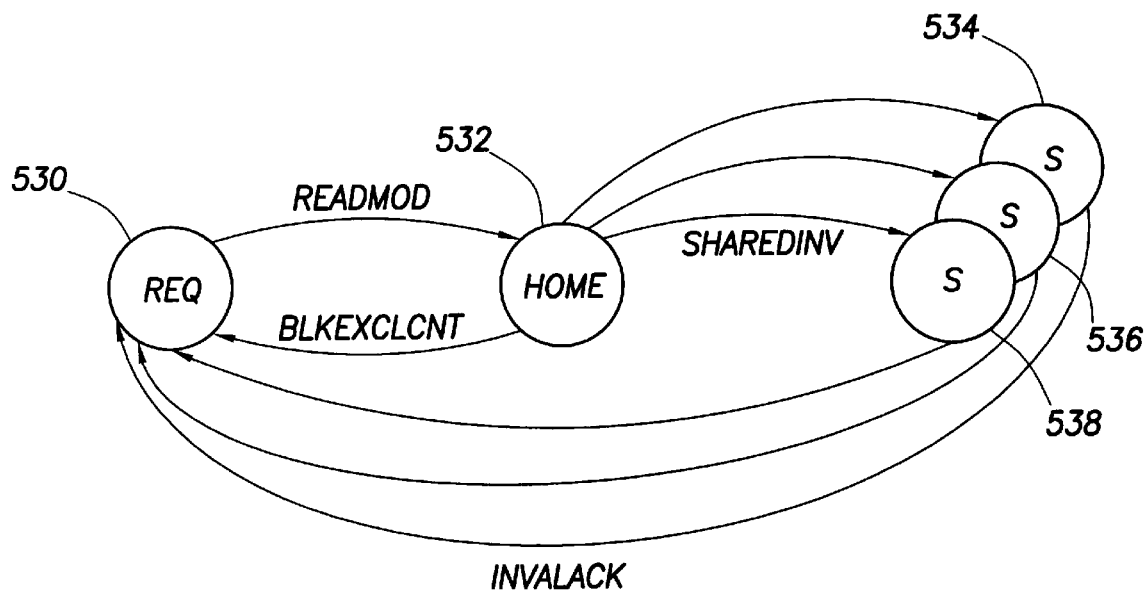
FIG. 5f shows an example of a remote write request with remote sharers that contain a shared copy of the block.

FIG. 5f shows a write request from a Requestor 530 to a memory block that is present in remote sharers 534, 536 and 538. In this scenario, the Home 532 is remote, and the directory state for the memory block is shared. The Requestor 530 performs a modify request ("READMOD") that is sent to the Home node 532 containing the memory and directory for the referenced block. Home 532 sends invalidation requests to sharers 534, 536 and 538 ("SHAREDINV") and sends data back to the Requestor 530 using a BLKEXCLCNT. The Requestor 530 modifies the data and stores it in cache in a dirty state. BLKEXCLCNT notifies the Requestor of the number of INVALACKS to expect from the Sharers. Each Sharer 534, 536 and 538 reply to the Requestor 530 with invalidation acknowledgments ("INVALACK"). The Requestor proceeds when the data arrives, but must stall incoming requests and potential write backs of memory blocks until all INVALACKs are received.

Figure 5G:
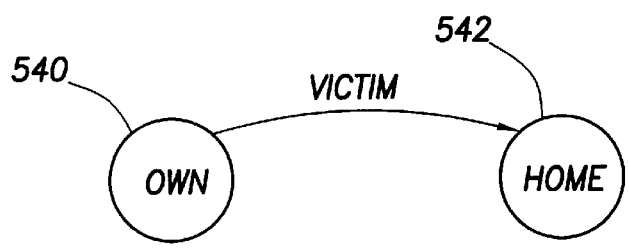
FIG. 5g shows an example of a write back from a remote Owner to Home.

FIG. 5g shows an example of a write back in which the Owner 540 contains an exclusive copy of the block in its cache and must replace this block. The Owner 540 sends a VICTIM/VICTIMCLEAN request with the data to Home 542 containing the memory and directory for the referenced block. Home 542 writes data to the local memory block and changes the directory state to local.

Use of a directory based cache and memory coherence protocol with the features described above has many advantages over prior art coherence protocols. Messages may be sent and received by the Rbox of each processor out of order for cache or memory references because of the VICTIMACKSHARED, FWDACKEXCL and INVALACK implementations used for the present system. Allowing out of order messaging permits the protocol to select any one of multiple paths between source and destination nodes thus making the distributed shared memory computer system more adaptive and efficient. If the out of order message results in an incorrect next program state, the system can restore the prior correct saved program state and continue execution. The coherency controller also restricts the operations that can be performed by any processor on the block of data prior to VICTIMACKSHARED, FWDACKEXCL or INVALACK being received.

In the cache and memory coherence protocol implemented for the preferred embodiment, communication directly between two nodes transferring the block of data is forced whenever possible. The Requestor when accessing a remote block of memory must go through the Home directory first-however, future communications whenever possible are directly between the Requestor and Owner. This minimizes memory access latency and increases program throughput. Another advantage of the present system is illustrated in FIG. 5g for cache victim transactions in which the Owner has a block exclusively in memory and must replace the block from the cache. The present system does not require an acknowledgment from the Home 542 to the Owner 540 before allowing the Owner to proceed to the next state of program execution. When a cache victim returns to its Home node, after a check of the directory in flight table to determine if a copy of the Victim memory block is required by any other node, the Victim memory block is written to the memory of the Home node and the directory is updated. Thus, unlike prior art systems, a read of the current directory state followed by modification of nodes based on the current directory state is not required. Under the coherence protocol of the preferred embodiment, if nothing is present in the DIFT, the block can be written to memory and directory updated without a read.

A fourth advantage of the cache coherence protocol of the preferred embodiment is that eviction of shared cache blocks does not have to be communicated to the directory in the Home node, only exclusive Owners of cache blocks must inform the Home directory.

A fifth advantage of the present system is that forward progress is guaranteed for all cache block fill requests-thus Negative Acknowledgment ("NACK") message types, informing the source to try again, that cause livelock problems are not present in the preferred embodiment. Livelock problems occur because of directory buffer overflows and are solved by guaranteeing priority to cache block fill request message types. The cache block request would remain in the network until accepted by the destination node.

A sixth advantage of the cache and memory coherence protocol implemented for the preferred embodiment is that the protocol supports optimistic invalidations of memory blocks in Sharer processors to allow for the highest possible performance in the common case of the Sharer not requiring immediate access to the memory block, yet supports a more conservative invalidation strategy that eliminates all unnecessary invalidates to guarantee load-lock/store-conditional forward progress. In the preferred embodiment, to make the coherence protocol a 3-hop protocol for most coherence messages, SHAREDINVALs are sent out speculatively by the Home processor before the Home processor can determine whether the request will ultimately succeed or fail. In the case of a fail, these SHAREDINVALs are sent out unnecessarily and a cache block may have been unnecessarily invalidated. For most situations, unnecessary invalidations do not cause any problems.

However for data synchronization through load-lock/store-conditional message sequences such an invalidation may lead to problems. The basic idea of these message sequences is that the load-lock grabs a copy of the data block. If the data block is still in the cache at the time the store-conditional executes, then the store-conditional succeeds and writes the memory location. Otherwise the store-conditional fails. A store-conditional that finds a shared copy of a data block in the cache will issue a SHAREDTODIRTY or SHAREDTODIRTYSTC request. In that case, the success or failure of the store-conditional is determined by the success or failure of the SHAREDTODIRTY*. If the Home processor is sending out unnecessary invalidates, it is possible to get into a livelock condition where no processors can succeed because all the store-conditionals are being failed because of unnecessary invalidates that are generated by other store-conditionals.

This problem is solved in the preferred embodiment by dynamically switching between a 3-hop and 5-hop coherence protocol. Under the 5-hop coherence protocol, the Requestor uses a SHAREDTODIRTYSTC when it thinks there is a chance for livelock. In cases where the Home cannot exactly determine success or failure of the SHAREDTODIRTYSTC, it sends a SHAREDTODIRTYPROBCNT (probable success) to the Requestor. The Home node using SHAREDTODIRTYPROBCNT is asking the Requestor whether the request is going to succeed or fail. The Requestor responds with either SHAREDTODIRTYCOMPLETE (success) or SHAREDTODIRTYRELEASE (failure). The Home node only sends out SHAREDINVALs after the Requestor indicates SHAREDTODIRTYCOMPLETE. Thus, under the 5-hop coherence protocol there are no unnecessary invalidates. Thus, the coherence protocol dynamically adapts to a 5-hop protocol when necessary to avoid livelock.

A seventh advantage of the coherence protocol is that it is flexible enough to allow for two different very simple migratory sharing modes that can improve performance with no changes to the base coherence protocol. Two different migratory sharing modes are available in the preferred embodiment, with the processor uses configuration bits to determine which mode to use. Preferably, the coherence protocol can dynamically flip between the sharing modes for different memory references in order to optimize performance. No change is required in the Zbox memory controller to support these modes. The base coherence protocol supports either.

An eighth advantage of the coherence protocol is that is flexible enough to allow two different READ* modes for cache block access. READ* misses can either get a shared copy of the cache block or an exclusive-clean copy of a cache block, yet cache blocks will always eventually become shared with enough readers of the same cache block. In the preferred embodiment, the memory controller uses the reference type and configuration bits to determine whether to send out READREQs or READSHAREDREQs. All instruction fetches use READSHAREDREQs and data references select one or the other based on a configuration bit. The protocol is flexible enough so that one of the two modes can be selected dynamically.

Finally, the coherence protocol has the advantage that all memory cache block transfers (BLK* messages and VICTIM* messages) are RESPONSEs. This property simplifies the network design since fewer large cache block size buffers are needed in the network buffers of the Rbox since both the BLK* and VICTIM* messages can share the same buffers.

The above discussion is meant to be illustrative of the principles and various embodiments of the present invention. Numerous variations and modifications will become apparent to those skilled in the art once the above disclosure is fully appreciated. For example, the directory states and encodings shown in Table 1, Table 2, and Table 3 may be extended to other encodings and directory states (e.g., a Shared 4 state, sharing with four sharers) in the preferred embodiment of the invention. It is intended that the following claims be interpreted to embrace all such variations and modifications.

What is claimed is:

1. A distributed multiprocessing computer system, comprising:
   a plurality of processors each coupled to an associated memory module, wherein each memory module is configured to store data blocks that are shared between said processors,
   said plurality of processors comprising:
     a Home processor having a memory block including a data block and directory state information for said memory block, wherein the memory block is stored in an associated memory module; and
     an Owner processor having a copy of said memory block stored in a memory module associated with the Owner processor, said copy of said memory block being an exclusive copy; and
   a plurality of coherence controllers, wherein each coherence controller is coupled to an associated memory module, with each of said coherence controllers maintaining coherence of said shared data blocks in the associated memory module using said directory state information in said Home processor,
   wherein replacement of said copy of said memory block in said memory module associated with the Owner processor requires writing said copy of said memory block to the memory module associated with the Home processor and updating the Home processor directory state information without performing a read of the Home processor directory state information.

2. The distributed multiprocessing computer system of claim 1, wherein each coherence controller is capable of sending and receiving messages out of order to maintain the coherence of said shared data blocks in said memory module.

3. The distributed multiprocessing computer system of claim 2, wherein said plurality of processors further comprises:
   a Requester processor that encounters a read or write miss of said memory block, wherein said sending and receiving of messages to maintain cache coherency occurs directly between Requester and Owner processors without routing through the Home processor directory.

4. A distributed multiprocessing computer system, comprising:
   a plurality of processors each coupled to a memory module, wherein each memory module is configured to store data blocks that are accessible by any of said plurality of processors wherein said plurality of processors comprises:
     a Home processor having a memory block including a data block and directory state information for said memory block, wherein the memory block is stored in an associated memory module; and
     a plurality of Sharer processors, each having a shared copy of said memory block stored in an associated memory module; and
   a plurality of coherence controllers, wherein each coherence controller is coupled to an associated memory module, with each of said coherence controllers maintaining coherence of said memory block in the associated memory modules using said directory state information in said Home processor, wherein each coherence controller is capable of sending and receiving messages out of order to maintain the coherence of said shared data in said memory module.

5. The distributed multiprocessing computer system of claim 4, wherein the plurality of processors further comprise a Requestor processor that encounters a read or write miss of said memory block in its memory module, wherein said sending and receiving of messages to maintain cache coherency occurs directly between Requester and Sharer processors without routing through a coherence controller of the Home processor.

6. The distributed multiprocessing computer system of claim 5, wherein eviction of said shared copy of said memory block in does not have to be communicated to said Home processor.

7. A distributed multiprocessing computer system, comprising:
   a plurality of processors each coupled to an associated memory module, wherein each memory module is configured to store data blocks that are shared between said processors,
   wherein the plurality of processors comprises:
     a first processor having a memory block including a data block and directory state information for said memory block, wherein the memory block is stored in an associated memory module; and
     a second processor having a copy of said memory block stored in a memory module associated with the second processor, said copy of said memory block being an exclusive copy; and
   a plurality of coherence controllers, wherein each coherence controller is coupled to an associated memory module, with each of said coherence controllers maintaining coherence of said shared data blocks in the associated memory modules using said directory state information stored by said first processor,
   wherein replacement of said copy of said memory block in said memory module associated with the second processor requires writing said copy of said memory block to the memory module associated with the first processor and updating the first processor directory state information without performing a read of the first processor directory state information.

8. A distributed multiprocessing computer system, comprising:
   a plurality of processors each coupled to a memory module, wherein each memory module is configured to store data blocks that are accessible by any of said plurality of processors, wherein the plurality of processors comprises:
     a first processor having a memory block including a data block and directory state information for said memory block, wherein the memory block is stored in a memory module associated with the first processor;

a plurality of second processors, each having a shared copy of said memory block stored in a memory module associated with the second processor; and a plurality of coherence controllers, wherein each coherence controller is coupled to an associated memory module, with each of said coherence controllers maintaining coherence of said memory block in the associated memory modules using said directory state information in said first processor, wherein each coherence controller is capable of sending and receiving messages out of order to maintain the coherence of said shared data in said memory module.

9. A method of maintaining memory coherence in a distributed shared memory computer system including a plurality of processors, comprising:

requesting a copy of a data portion of a memory block from a Home processor to perform a write operation on the copy of the data portion, wherein the memory block further includes a directory state portion;

storing said copy of said data portion as part of a new memory block in a memory associated with an Owner processor, wherein the new memory block includes a directory state portion that indicates the new memory block is exclusively held;

updating the directory state portion for said memory block in said Home processor to indicate the write operation on the copy of said data portion in said memory associated with the Owner processor;

replacing said new memory block in said memory associated with the Owner processor, wherein said replacing requires writing said copy of said data portion to a memory module associated with the Home processor and updating of the Home processor's directory state portion without performing a read of the Home processor's directory state portion.

10. The method of claim 9 wherein said updating comprises sending and receiving messages out of order to maintain the coherence of said data portion.

11. A method of maintaining memory coherence in a distributed shared memory computer system including a plurality of processors, comprising:

requesting a copy of a data portion of a memory block from a Home processor to perform a read operation on the copy of the data portion, said copy of data portion being stored in each of a plurality of memories each associated with a Sharer processor; and updating a directory state portion of the memory block in said Home processor to indicate the read operation on the data portion, wherein the updating includes sending and receiving messages out of order.

12. The method of claim 11 further comprising sending and receiving of messages to maintain memory coherence of the data portion, wherein the sending and receiving occurs directly between a Requester processor requesting a copy of the memory block and Sharer processor without being routed through the Home processor.

13. A method of maintaining memory coherence in a distributed shared memory computer system including a plurality of processors, comprising:

requesting a copy of a memory block from a first processor to perform a write operation on the copy of the memory block, wherein the memory block includes a data portion and a directory state portion;

storing said copy of said memory block exclusively in a memory associated with a second processor;

updating the directory state portion of said memory block in said first processor to indicate the write operation on the copy of said memory block in said memory associated with the second processor; and replacing said copy of said memory block in said memory associated with the second processor, wherein said replacing requires writing said copy of said memory block to a memory module associated with the first processor and updating of the first processor's directory state portion without performing a read of the first processor's directory state portion.

14. A method of maintaining memory coherence in a distributed shared memory computer system including a plurality of processors, comprising:

requesting a copy of a memory block from a first processor to perform a read operation on the copy of the memory block, wherein said copy of said memory block is stored in each of a plurality of cache memories each associated with a second processor, and wherein said memory block includes a data portion and a directory state portion; and updating the directory state portion of the memory block in said first processor to indicate the read operation on the copy of the memory block by sending and receiving messages out of order.

15. A distributed multiprocessing computer system, comprising:

a plurality of processors each coupled to an associated memory module, wherein each memory module is configured to store memory blocks that are shared between said processors, said plurality of processors comprising:

a Home processor having a memory block including a data portion and a directory state portion for said memory block, wherein the memory block is stored in an associated memory module; and an Owner processor having a copy of said memory block stored in a memory module associated with the Owner processor, said copy of said memory block being an exclusive copy;

a plurality of coherence controllers, wherein each coherence controller is coupled to an associated memory module, with each of said coherence controllers maintaining coherence of shared memory blocks in the associated memory module using said directory data portion in said Home processor, wherein replacement of said copy of said memory block in said memory module associated with the Owner processor requires writing said copy of said memory block to the memory module associated with the Home processor and updating the Home processor's directory portion without performing a read of the Home processor's directory portion; and a disk drive coupled one of said plurality of processors.

16. A computer system having a scalable directory-based cache coherence protocol, wherein the system comprises:

multiple processors each having an associated cache;

multiple memories, each memory being associated with a respective home processor; and multiple coherence controllers, each controller being associated with a respective home memory, wherein each of said multiple memories comprises a shared data area configured to store blocks, each block including a data portion and a directory state portion, and each block having an associated home memory, wherein each of the coherence controllers is configured to maintain the coherence of blocks in the shared data areas, wherein a coherence controller that replaces an exclusive copy of a block does so by sending the block to the home memory, and wherein the coherence controller associated with the home memory writes the block to the home memory without modification.

17. The system of claim 16, wherein the directory state portion of a block has a configurable state to indicate that the block is not held in a memory of a remote processor.

18. The system of claim 17, wherein the directory state portion of the block has a configurable state to identify a remote processor that holds the block exclusively in an associated memory.

19. The system of claim 18, wherein the directory state portion of the block has a configurable state to identify a remote processor that holds the block sharable in an associated memory.

20. The system of claim 19, wherein the directory state portion of the block has a configurable state to identify two remote processors that hold the block sharable in their associated memories.

21. The system of claim 20, wherein the configurable state to identify two remote processors comprises two multi-bit fields that each hold an identifier of a respective remote processor.

22. The system of claim 20, wherein the directory state portion of the block has a configurable state to identify three remote processors that hold the block sharable in their associated memories.

23. The system of claim 22, wherein the configurable state to identify three remote processors is selectively enabled depending on the number of processors in the system.

24. The system of claim 21, wherein the directory state portion of the block has a configurable state to identify groups of remote processors having at least one remote processor that holds the block sharable in an associated memory.

25. The system of claim 20, wherein the directory state portion of the block has a configurable state to indicate a coherency error condition.

26. The system of claim 16, wherein the block further comprises an error correcting code (ECC) portion derived from the directory state portion.

27. The system of claim 16, wherein the directory state portion comprises a first bit that when asserted indicates that the directory state portion identifies groups of remote processors having at least one remote processor that holds the block sharable in an associated memory.

28. The system of claim 27, wherein the directory state portion comprises a second bit that when asserted with the first bit de-asserted indicates that the directory state portion identifies at least one remote processor that holds the block sharable in an associated memory.

29. The system of claim 28, wherein the directory state portion comprises a third bit that when asserted with the first and second bits de-asserted indicates that the directory state portion identifies a remote processor that holds the block exclusively in an associated memory.

30. The system of claim 29, wherein the directory state portion comprises a fourth bit that when asserted with the first, second, and third bits de-asserted indicates a coherency error condition of the block.

31. The system of claim 16, wherein the block consists of 72 bytes and the data portion consists of 64 bytes.

32. The system of claim 16, wherein each coherence controller comprises a directory in-flight table to track directory status of recently accessed blocks, and wherein each coherence controller is configured to update the directory state portion of the recently accessed blocks when associated responses are received from remote processors.

* * * * *